UNITED STATES PATENT OFFICE.

EDWARD M. LANG, OF PORTLAND, MAINE, ASSIGNOR TO HIMSELF AND GEORGE BURNHAM, JR., OF SAME PLACE.

IMPROVEMENT IN SOLDERING-TOOLS.

Specification forming part of Letters Patent No. 171,941, dated January 11, 1876; application filed January 21, 1875.

*To all whom it may concern:*

Be it known that I, EDWARD M. LANG, of Portland, in the county of Cumberland and State of Maine, have invented certain new and useful Improvements in the Process of Soldering; and I do hereby declare that the following is a full, clear, and exact description thereof, that will enable others skilled in the art to which it appertains to make and use the same.

My invention relates to an improvement in soldering-tools, with especial reference to the circular soldering tools or dies used for soldering circular seams, as for capping cans in the process of packing fruits or meats.

Soldering-tools have been made of iron, but many objections were found to their use. Such tools required constant filing and repairs, demanding the application of the file several times a day, and soon became so roughened and cracked as to be practically useless—seldom wearing more than a month. The character of the work produced by them was necessarily poor, although skilled labor and great care were required in their use.

The iron tool has been almost entirely excluded from use by the substitution of copper as a material. These tools are open to the same disadvantages as attend the employment of the iron tool, but in a less degree. Like the iron tool they require repairing and filing, but not so frequently; yet, with the greatest care, it is difficut to use them without filing them at least twice a day, and it is rarely the case that a copper tool is not worthless after being used a month. A decided advantage of the copper tool over the iron is that it will "tin"—*i. e.*, when the tool, after being dipped in the acid solution for the purpose of freeing it from the dirt and ashes of the fire, is brought into contact with the solder, it takes upon its surface a coating of the tin of the solder, and unless the tool does so tin it is not considered in proper condition for use. Any overheating of the tool, however, prevents tinning taking place, and the tool must be laid aside to be filed. It is found, moreover, that charcoal can alone be used in heating the copper tool.

The rapid destruction of the tools from the action of the fire or acid, or both combined, the necessity for frequent repairs and loss of time required in changing tools, the high price of the fuel required by the copper tool, and the necessary employment of skilled and experienced workmen to manipulate them are large items of expense, and serious objections to their use. Neither is the work produced by these tools uniformly of the best character.

My improvement consists in the employment of steel or cast-steel in the manufacture of soldering-tools. Tools so made require no filing or repairs, and consequently never collect the solder, in consequence of becoming roughened or surface-cracked—a fault to which, indeed, they would otherwise have little tendency, by reason of their very small capillary attraction for the substances of which the solder is composed. These tools tin very readily, and without regard to the temperature to which they may have been heated. They can be used and still continue in good condition for a season, and even much longer, and can be heated with any fuel, while from the perfect character of the tool no especial degree of experience is required in the workman. The work produced is of a uniformly better character, and the saving of solder large.

What I claim as my invention, and desire to secure by Letters Patent of the United States, is—

A steel or cast-steel soldering tool or die, as and for the purpose set forth.

In testimony that I claim the foregoing I have hereunto set my hand this 31st day of December, 1874.

EDWARD M. LANG.

Witnesses:
GEO. E. BIRD,
JNO. J. THOMAS.